(12) United States Patent
Le Berre et al.

(10) Patent No.: US 11,094,116 B2
(45) Date of Patent: Aug. 17, 2021

(54) SYSTEM AND METHOD FOR AUTOMATIC GENERATION OF A THREE-DIMENSIONAL POLYGONAL MODEL WITH COLOR MAPPING FROM A VOLUME RENDERING

(71) Applicant: GE Precision Healthcare LLC, Milwaukee, WI (US)

(72) Inventors: Yannick Le Berre, Meulan en Yvelines (FR); Jerome Durant, Paris (FR); Amaury Walbron, Massy (FR); Ilan Stefanon, Massy (FR); Adeline Digard, Bonnelles (FR)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 0 days.

(21) Appl. No.: 16/731,458

(22) Filed: Dec. 31, 2019

(65) Prior Publication Data
US 2021/0150811 A1 May 20, 2021

Related U.S. Application Data

(60) Provisional application No. 62/936,838, filed on Nov. 18, 2019.

(51) Int. Cl.
*G06T 17/20* (2006.01)
*G06T 15/08* (2011.01)
*G06T 19/20* (2011.01)

(52) U.S. Cl.
CPC .............. *G06T 17/20* (2013.01); *G06T 15/08* (2013.01); *G06T 19/20* (2013.01); *G06T 2210/41* (2013.01); *G06T 2219/2012* (2013.01)

(58) Field of Classification Search
CPC ......... G06T 19/00; G06T 17/20; G06T 17/00; G06T 15/10; G06T 15/00; G06T 17/205;
(Continued)

(56) References Cited

U.S. PATENT DOCUMENTS

| | | | | |
|---|---|---|---|---|
| 6,084,593 A | * | 7/2000 | Gibson | ................... G06T 17/10 345/424 |
| 9,582,923 B2 | | 2/2017 | Brown | |

(Continued)

OTHER PUBLICATIONS

Lorensen et al., "Marching Cubes: A High Resolution 3D Surface Construction Algorithm," Computer Graphics, vol. 21, No. 4, Jul. 1987, pp. 163-169.

(Continued)

*Primary Examiner* — Todd Buttram
(74) *Attorney, Agent, or Firm* — McAndrews, Held & Malloy, Ltd.; Greg Threadgill; Lucas Divine

(57) ABSTRACT

Systems and methods are provided for automatically generating a three-dimensional (3D) polygonal model with color mapping from a volume rendering. The method includes generating a volume rendering from volumetric data. The method includes receiving a user selection to launch model and color generation. The method includes automatically generating a 3D mask from the volume rendering by segmenting at least one object in the volume rendering in response to the user selection. The method includes automatically generating a 3D mesh for the at least one object based on the 3D mask in response to the user selection. The method includes automatically computing mesh colors based on the volume rendering in response to the user selection. The mesh colors are applied to the 3D mesh to generate a multi-color 3D polygonal model. The method includes automatically outputting the multi-color 3D polygonal model in response to the user selection.

20 Claims, 5 Drawing Sheets

(58) Field of Classification Search
CPC ....... G06T 15/04; G06T 11/40; G06T 15/005; G06T 11/001; G09G 5/02; G09G 5/06; G09G 2320/0666; G09G 2320/0626
See application file for complete search history.

(56) References Cited

U.S. PATENT DOCUMENTS

| | | |
|---|---|---|
| 9,846,973 B2 | 12/2017 | Buyanovskiy |
| 10,157,500 B2 | 12/2018 | Gritzky et al. |
| 10,492,761 B2 | 12/2019 | Gritzky et al. |
| 2002/0118875 A1* | 8/2002 | Wilensky ............... G06T 7/194 382/173 |
| 2010/0134491 A1 | 6/2010 | Borland et al. |
| 2010/0149174 A1* | 6/2010 | Nakao ............... G06T 15/08 345/419 |
| 2012/0224755 A1 | 9/2012 | Wu |
| 2013/0069945 A1* | 3/2013 | Ledesma Carbayo ............... A61B 90/36 345/420 |
| 2014/0033041 A1 | 1/2014 | Lyons et al. |
| 2015/0029184 A1 | 1/2015 | Masumoto |
| 2015/0138201 A1* | 5/2015 | Brown ............... G06T 15/08 345/426 |
| 2015/0145864 A1* | 5/2015 | Buyanovskiy ......... G06T 19/20 345/426 |
| 2017/0106597 A1 | 4/2017 | Gritzky et al. |
| 2017/0109925 A1 | 4/2017 | Gritzky et al. |
| 2018/0144516 A1* | 5/2018 | Pri-Tal ............... G06T 11/008 |
| 2019/0266790 A1* | 8/2019 | Song ............... G06T 17/00 |
| 2020/0357158 A1* | 11/2020 | Zhang ............... G06T 7/30 |

OTHER PUBLICATIONS

Lars Chr. Ebert, et al., "Getting in touch—3D printing in Forensic Imaging ," Forensic Science International, vol. 211, No. 1, Apr. 21, 2011, pp. e1-e6.

PCT Invitation to Pay Additional Fees and Annex to Form PCT/ISA/206 Partial International Search corresponding to International Application No. PCT/US2020/059096, dated May 11, 2021, 18 pages.

* cited by examiner

SYSTEM AND METHOD FOR AUTOMATIC GENERATION OF A THREE-DIMENSIONAL POLYGONAL MODEL WITH COLOR MAPPING FROM A VOLUME RENDERING

CROSS-REFERENCE TO RELATED APPLICATIONS/INCORPORATION BY REFERENCE

The present application claims priority under 35 U.S.C. § 119(e) to provisional application Ser. No. 62/936,838 filed on Nov. 18, 2019, entitled "SYSTEM AND METHOD FOR AUTOMATIC GENERATION OF A THREE-DIMENSIONAL POLYGONAL MODEL WITH COLOR MAPPING FROM A VOLUME RENDERING." The above referenced provisional application is hereby incorporated herein by reference in its entirety.

FIELD

Certain embodiments relate to medical imaging. More specifically, certain embodiments relate to methods and systems for automatically generating a three-dimensional (3D) polygonal model with color mapping from a volume rendering.

BACKGROUND

Various medical imaging techniques may be used to image organs and soft tissues in a human body, such as ultrasound imaging, computed tomography (CT) scans, magnetic resonance imaging (MRI), and the like. Typically, during medical imaging, imaging datasets (volumetric imaging datasets during 3D/4D imaging) are acquired and used in generating and rendering the corresponding images (e.g., via a display) in real-time. In some instances, however, it may be desirable to generate a 3D object corresponding with the structure depicted in the medical image data, which is commonly referred to as 3D printing. 3D printing of physical models may provide anatomical structures useful for surgical planning, research, medical product development, keepsakes, and the like. To perform 3D printing, a 3D printer is provided with a digital model of the structure to be generated. However, digital model generation is a time consuming process that typically involves significant user input. For example, a user may interact with image processing software to perform image segmentation to identify and delineate structures, such as bone, tissue, and vessels. The user may further interact with modeling software to generate a 3D model, such as a 3D polygonal model, from the segmented image data. Moreover, the user may interact with the modeling software to map colors to the 3D polygonal model. The 3D model may then be provided to 3D printing software for formatting and printing via a 3D printer. Accordingly, the typical process for 3D printing a physical model from a medical imaging dataset may be a complex, time-consuming, and challenging task.

Further limitations and disadvantages of conventional and traditional approaches will become apparent to one of skill in the art, through comparison of such systems with some aspects as set forth in the remainder of the present application with reference to the drawings.

BRIEF SUMMARY

A system and/or method is provided for automatically generating a three-dimensional (3D) polygonal model with color mapping from a volume rendering, as set forth more completely in the claims.

These and other advantages, aspects and novel features of the present invention, as well as details of an illustrated embodiment thereof, will be more fully understood from the following description and drawings.

DETAILED DESCRIPTION

Figure 1A:
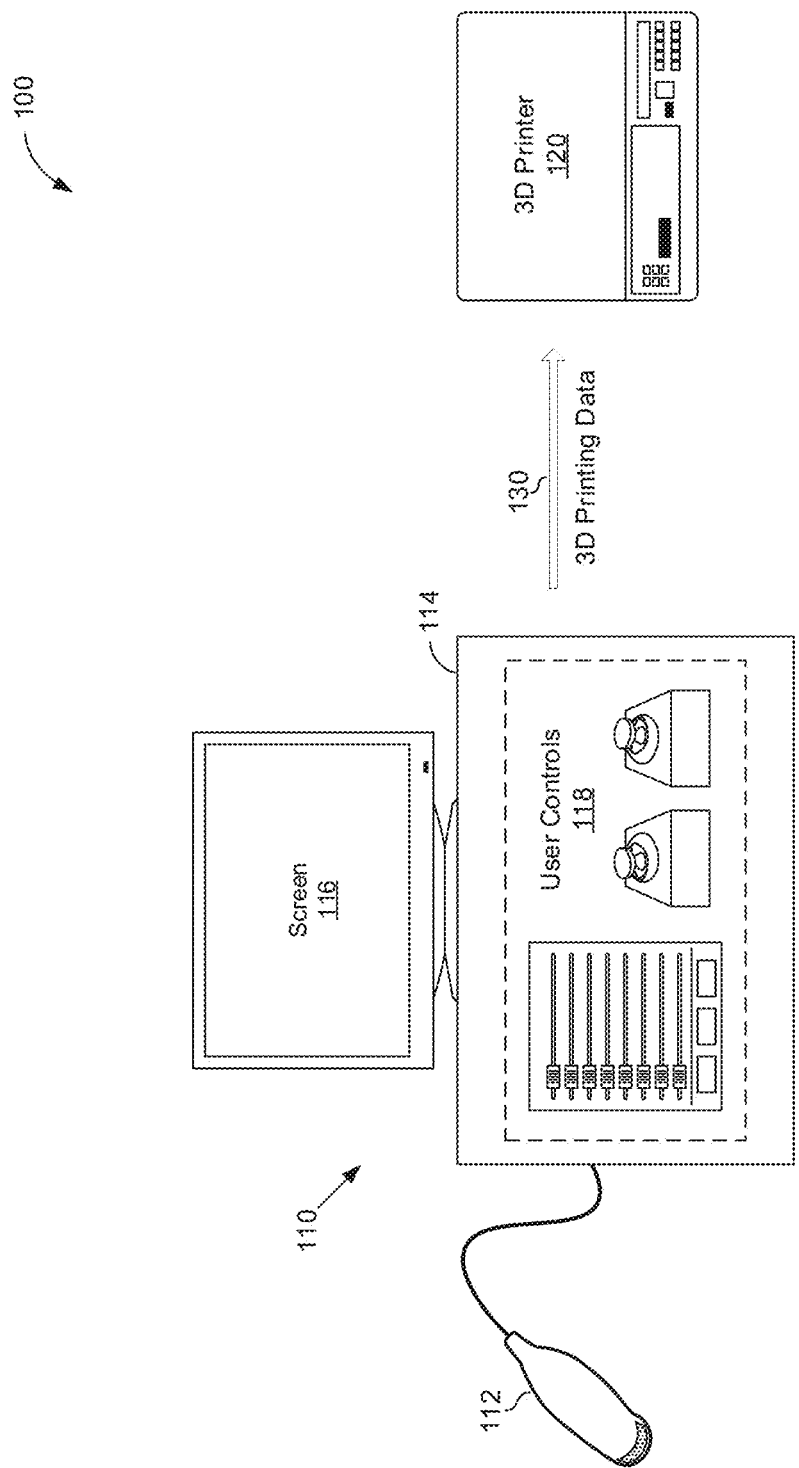
FIG. 1A is a block diagram illustrating an example medical imaging arrangement for automatically generating a three-dimensional (3D) polygonal model with color mapping from a volume rendering for 3D printing, in accordance with an example embodiment.

Certain embodiments may be found in methods and systems for automatically generating a three-dimensional (3D) polygonal model with color mapping from a volume rendering. Aspects of the present disclosure may have the technical effect of providing a 3D polygonal model mapped with colors corresponding to a volume rendering in response to a single user instruction (e.g., button depression, touch-screen selection, etc.) thereby reducing 3D colored model creation time, simplifying user workflow, and providing realistic 3D printed color models substantially matching the volume rendering (i.e., what you see is what you get). More specifically, various embodiments facilitate 3D printing during medical imaging by generating multi-colored 3D mesh data (also referred to herein as a multi-colored 3D polygonal model) based on the volume rendered images. In this regard, during medical imaging, volumetric datasets may be generated and volume rendered images may be generated and/or displayed, based on the volumetric datasets. The multi-colored 3D mesh data may then be generated, based on the volume rendered images with the multi-colored 3D mesh data being configured to enable producing a physical volume representation of one or more objects and/or structures in the volume rendered images. The multi-colored 3D mesh data may then be used for 3D printing. For example, the multi-colored 3D mesh data may be used in generating 3D printing data, for enabling the 3D printing via a corresponding 3D printer. The 3D printing data may be configured and formatted based on a pre-defined 3D printing standard or file format supported by the 3D printer.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments. The following detailed description is, therefore, not to be taken in a limiting sense, and the scope of the present disclosure is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "an exemplary embodiment," "various embodiments," "certain embodiments," "a representative embodiment," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. For example, as used herein the term "image" is used to refer to ultrasound images, magnetic resonance imaging (MRI) images, computed tomography (CT) images, and/or any suitable medical image. Further, with respect to ultrasound imaging, for example, the term "image" may refer to an ultrasound mode such as B-mode (2D mode), M-mode, three-dimensional (3D) mode, CF-mode, PW Doppler, CW Doppler, MGD, and/or sub-modes of B-mode and/or CF such as Shear Wave Elasticity Imaging (SWEI), TVI, Angio, B-flow, BMI, BMI_Angio, and in some cases also MM, CM, TVD where the "image" and/or "plane" includes a single beam or multiple beams.

Furthermore, the term processor or processing unit, as used herein, refers to any type of processing unit that can carry out the required calculations needed for the various embodiments, such as single or multi-core: CPU, Accelerated Processing Unit (APU), Graphics Board, DSP, FPGA, ASIC or a combination thereof.

In various embodiments, imaging processing, including visualization enhancement, to form images may be performed, for example, in software, firmware, hardware, or a combination thereof.

FIG. 1A is a block diagram illustrating an example medical imaging arrangement 100 for automatically generating a three-dimensional (3D) polygonal model with color mapping from a volume rendering for 3D printing, in accordance with an example embodiment. Referring to FIG. 1A, the medical imaging arrangement 100 comprises a medical imaging system 110 and a 3D printer 120.

The medical imaging system 110 may comprise suitable logic, circuitry, interfaces and/or code that may be operable to acquire medical image data, process the medical image data to provide a volume rendering, and process the volume rendering to provide a multi-colored 3D mask suitable for 3D printing. In various embodiments, the medical imaging system 110 may be an ultrasound system, MRI imaging system, CT imaging system, or any suitable imaging system operable to generate and render medical image data. The medical imaging system 110 may comprise an imaging device 112, display/control unit 114, display screen 116, and user controls 118. The imaging device 112 may be an ultrasound probe, MRI scanner, CT scanner, or any suitable imaging device. The imaging device may comprise suitable logic, circuitry, interfaces and/or code that may be operable to capture and/or generate a particular type of imaging signals (or data corresponding thereto), such as by being moved over a patient's body (or part thereof).

The display/control unit 114 may be one or more central processing units, microprocessors, microcontrollers, and/or the like. The display/control unit 114 may be an integrated component, or may be distributed across various locations. For example, the display/control unit 114 may provide support for medical imaging acquisition and medical imaging visualization. Alternatively, the medical imaging acquisition and medical imaging visualization may be distributed across various systems.

The display/control unit 114 may comprise suitable logic, circuitry, interfaces and/or code that may be operable to process image data and display images (e.g., via a display screen 116). For example, the display/control unit 114 may comprise suitable logic, circuitry, interfaces and/or code that may be operable to acquire volumetric image data and perform volume rendering on 3D and/or 4D volumes. The display/control unit 114 may generate and present volume renderings (e.g., 2D projections) of the volumetric (e.g., 3D and/or 4D) datasets. In this regard, rendering a 2D projection of a 3D and/or 4D dataset may comprise setting or defining a perception angle in space relative to the object being displayed, and then defining or computing necessary information (e.g., opacity and color) for every voxel in the dataset. This may be done, for example, using suitable transfer functions for defining RGBA (red, green, blue, and alpha) value for every voxel. The resulting volume rendering may include a depth map correlating a depth value to each pixel in the 2D projection. The display/control unit 114 may be operable to present the generated volume rendering at a display screen 116 and/or store the generated volume rendering at any suitable data storage medium.

The display/control unit 114 may support user interactions (e.g., via user controls 118), such as to allow controlling of the medical imaging. For example, the display/control unit 114 may comprise suitable logic, circuitry, interfaces and/or code that may be operable to generate a multi-colored 3D polygonal model (i.e., multi-colored 3D surface mesh) based on a volume rendering in response to a user selection via user controls 118. As an example, a user viewing a volume rendering at the display screen 116 may desire to print a 3D model of the anatomical object(s) depicted in the volume rendering. Accordingly, the user may select a 3D model and color generation option to receive the multi-colored 3D polygonal model that may be provided to 3D printing software of the 3D printer 120 to print the 3D model of the object(s) in multiple colors. The multi-colored 3D polygonal model may appear substantially as shown in the volume rendering, thereby providing the user with a "what you see is what you get" one-click workflow from volume rendering to multi-colored 3D polygonal model. The generation of the multi-colored 3D polygonal model from the volume rendering is described in detail below with reference to FIG. 2.

The user controls 118 may be utilized to input patient data, imaging parameters, settings, select protocols and/or templates, select an examination type, select acquisition and/or display processing parameters, initiate volume rendering, initiate multi-colored 3D mesh generation, and the like. In an exemplary embodiment, the user controls 118 may be operable to configure, manage and/or control operation of one or more components and/or modules in the medical imaging system 110. The user controls 118 may include button(s), rotary encoder(s), a touchscreen, motion tracking, voice recognition, a mousing device, keyboard, camera and/or any other device capable of receiving a user directive. In certain embodiments, one or more of the user controls 118 may be integrated into other components, such as the display screen 116, for example. As an example, user controls 118 may include a touchscreen display.

The display screen 116 may be any device capable of communicating visual information to a user. For example, a display screen 116 may include a liquid crystal display, a light emitting diode display, and/or any suitable display or displays. The display screen 116 can be operable to present medical images and/or any suitable information. For example, the medical images presented at the display screen may include ultrasound images, CT images, MRI images, volume renderings, multi-colored 3D meshes (also referred to as multi-colored 3D polygonal models), and/or any suitable information.

The 3D printer 120 may comprise suitable logic, circuitry, interfaces and/or code that may be operable to perform 3D printing. In this regard, the 3D printer 120 may be configured to produce (e.g., synthesize) three-dimensional physical representations, such as based on the 3D printing data corresponding to and/or based on multi-colored 3D polygonal models of the would-be printed objects. The 3D printer 120 may be any of commercially available products, which may be communicatively coupled to the medical imaging system 110, via suitable connections, wired (e.g., cords) and/or wireless (e.g., WiFi, Bluetooth, etc.). The 3D printer 120 may also be part of the medical imaging system 110 itself, and may even by incorporated directly into it.

In operation, the medical imaging system 110 may be used in generating and presenting volume renderings. The volume renderings may be used to generate multi-color 3D polygonal models suitable for 3D printing. The medical imaging system 110 may be operable to support 3D printing, for example, via the 3D printer 120. The 3D printer 120 may be operable to generate physical volume representations of objects and/or structures in the volume renderings. For example, expecting parent(s) may want to have 3D printouts of ultrasound images displayed during obstetric (OB) imaging scans as a keepsake, such as a fetus and/or particular features thereof (e.g., face). The 3D printouts or data corresponding thereto may also be useful as reference for medical services, such as to help generate a model for use in surgical planning. The 3D physical objects may be synthesized using the 3D printer 120. The 3D printer 120 may be operable to use additive processes to lay successive layers of material. The synthesized volume objects may be of almost any shape and/or geometry. The 3D printer 120 and/or 3D printing operations may be configured and/or controlled based on 3D printing data 130, which may comprise information corresponding to and/or representing the would-be printed objects (or structures thereof). The 3D printing data 170 may be generated based on the multi-color 3D polygonal models and may be formatted in accordance with one or more defined formats for use in 3D printing, such as 3MF file format based data. In this regard, the 3D printing data 130 may be generated and/or configured based on 3D modeling of the objects and/or structures in the volume renderings, and may be formatted based on the supported printing data formats in the 3D printer 120.

As illustrated in FIG. 1A, the generation of the 3D printing data 130 is shown as being done directly in the medical imaging system 110 (e.g., within the display/control unit 114, using suitable processing circuitry therein). The disclosure is not so limited, however. Rather, in some instances, at least some of the processing performed to generate the 3D printing data based on the imaging related information may be offloaded to a dedicated system, which may be located near or remote from the imaging setup.

Figure 1B:
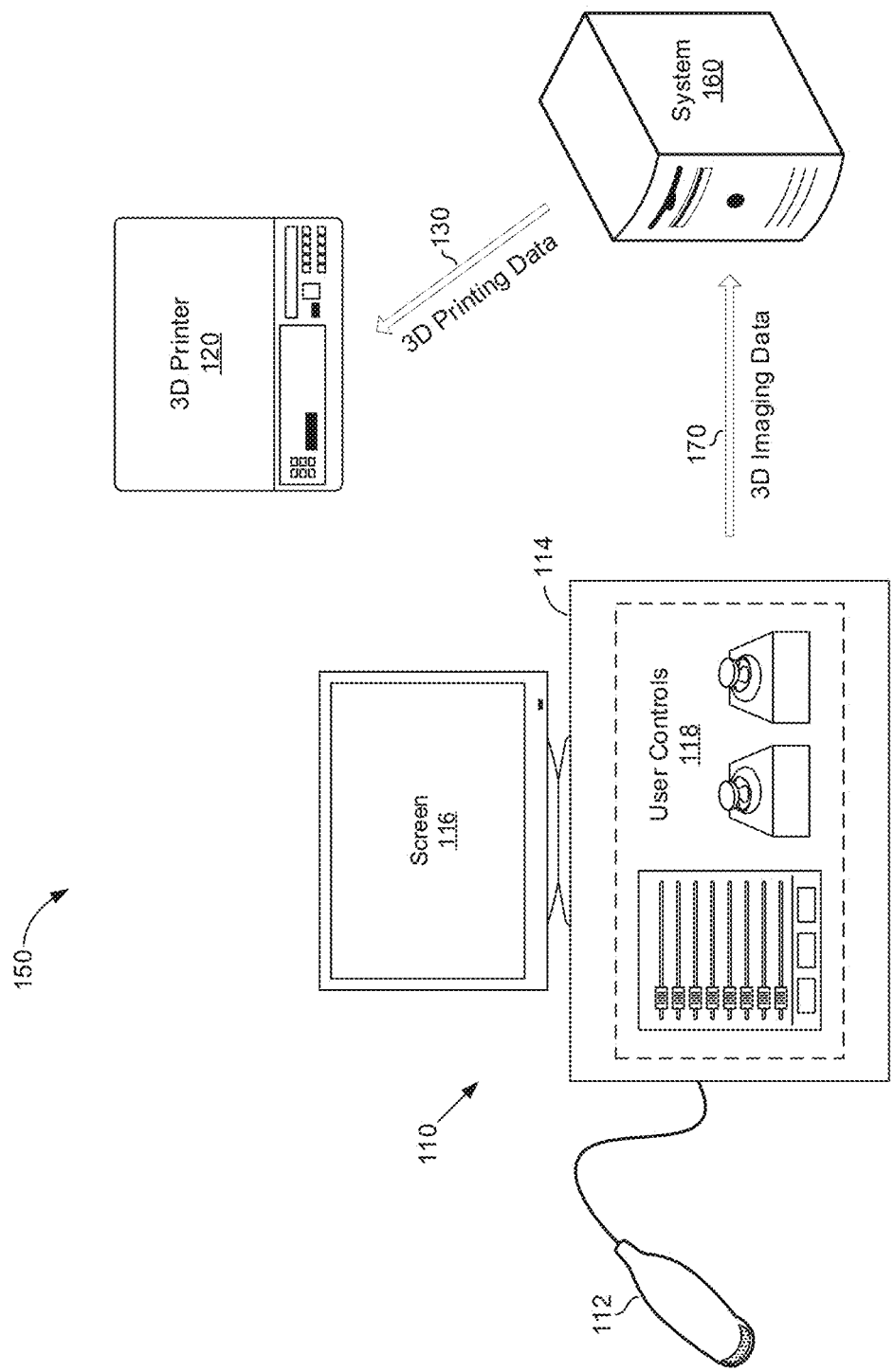
FIG. 1B is a block diagram illustrating an example medical imaging arrangement that supports three-dimensional (3D) printing, with offloaded processing for automatically generating 3D polygonal model with color mapping from a volume rendering, in accordance with an example embodiment.

FIG. 1B is a block diagram illustrating an example medical imaging arrangement 150 that supports three-dimensional (3D) printing, with offloaded processing for automatically generating a 3D polygonal model with color mapping from a volume rendering, in accordance with an example embodiment. Referring to FIG. 1B, the medical imaging arrangement 150 may comprise the medical imaging system 110 and the 3D printer 120 as well as a computing system 160.

The computing system 160 may comprise suitable logic, circuitry, interfaces and/or code that may be operable to process, store, and/or communicate data. In this regard, the computing system 160 may be operable to receive 3D imaging data 170, such as volumetric medical imaging datasets and/or volume renderings corresponding to the volumetric medical imaging datasets. The computing system 160 may be operable to generate multi-color 3D surface meshes from the volume renderings. The computing system 160 may be operable to format the multi-color 3D surface meshes to generate 3D printing data 130 that may be transmitted to a 3D printer 120. The computing system 160 may be dedicated equipment configured particularly for use in conjunction with medical imaging, including in support of 3D printing; or it may be a general purpose computing system (e.g., personal computer, server, etc.) setup and/or configured to perform the operations described with respect to the computing system 160. Communications between the different elements in the medical imaging arrangement 150 may be done using available wired and/or wireless connections, and/or in accordance any suitable communication (and/or networking) standards or protocols.

In an example implementation, the 3D printing data 130 may be generated via the medical imaging system 110 or the computing system 160 based on multi-color 3D surface mesh representations, which may be generated based on the volume rendering of the volumetric datasets acquired via the medical imaging system 110. Providing 3D printing in this manner ensures that 3D prints look substantially the same as the rendering on the display screen 116. Also, a fully automated workflow from volume data to 3D printing is possible with this approach, allowing for efficient and/or easy-to-use operation. Further, the rendering operations may enhance the quality of the 3D printing. For example, the rendering algorithm may act as non-linear filter smoothing the data and producing very reliable depth information compared to other segmentation methods. The rendered image may also be used in texturing the 3D prints to enhance quality of printed objects. This approach may also allow for control of the 3D printing by the user, such as based on user input (provided via the user controls 118). For example, the 3D printing may be controlled by the user based on user input relating to the volume rendering (e.g., selection of viewpoint, scaling, threshold, etc.). Further, the 3D printing may reflect use of techniques available for volume rendering, such as to cut away unwanted parts of the volume (e.g., masking with MagiCut, Vocal, Threshold, etc.). In other words, the 3D prints may only include the wanted parts of the objects.

Figure 2:
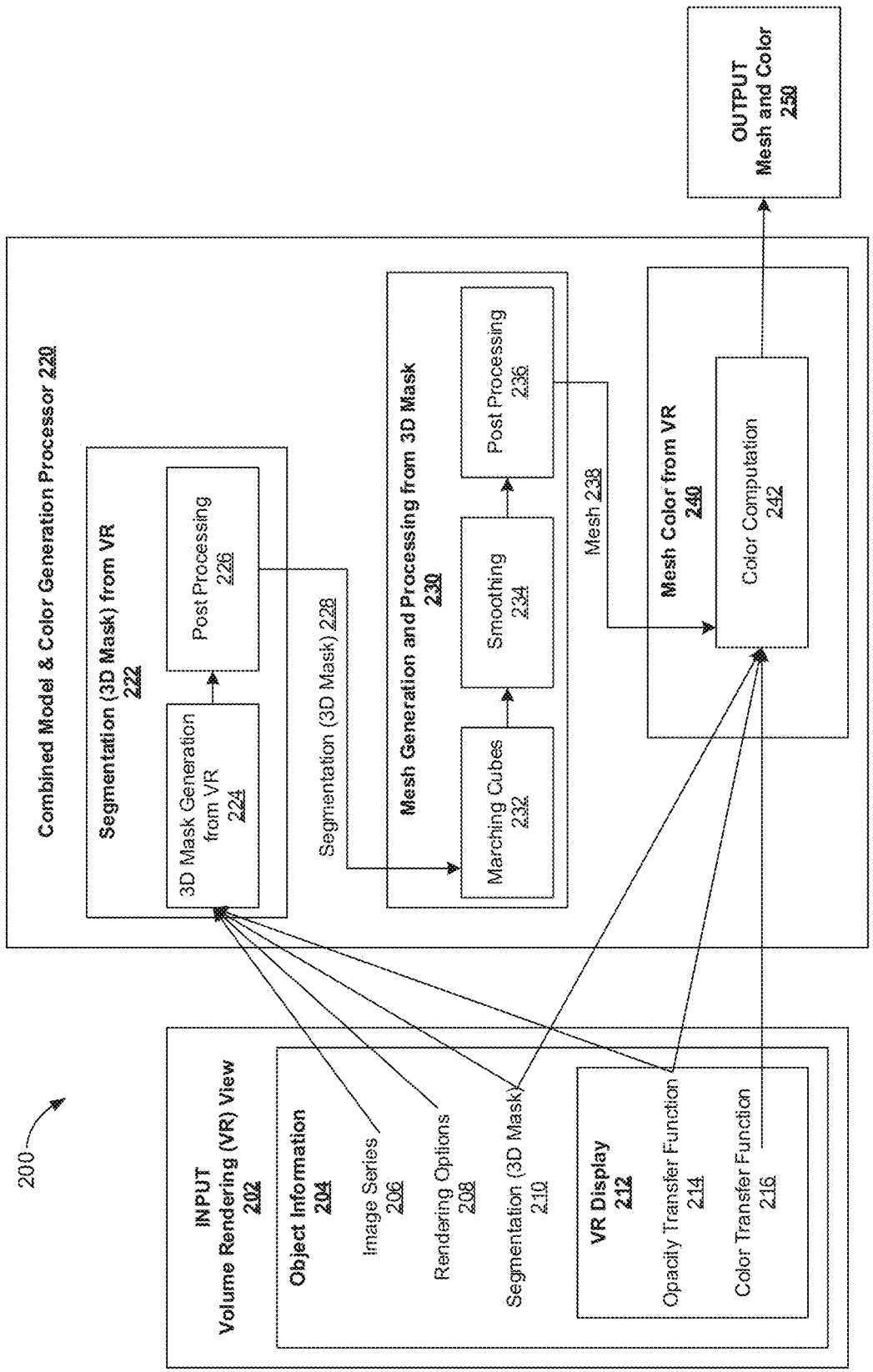
FIG. 2 is a block diagram illustrating an example combined model and color generation processor operable to automatically generate a three-dimensional (3D) polygonal model with color mapping from a volume rendering for 3D printing, in accordance with various embodiments.

FIG. 2 is a block diagram illustrating an example combined model and color generation processor 220 operable to automatically generate a three-dimensional (3D) polygonal model with color mapping 250 from a volume rendering 202 for 3D printing, in accordance with various embodiments. Referring to FIG. 2, the arrangement 200 comprises a volume rendering input 202 provided to a combined model and color generation processor 220, which provides the multi-color 3D polygonal model based on the volume rendering input 202. The volume rendering input 202 may include object information 204 comprising the volumetric data image series 206, rendering options 208 (e.g., cut planes), segmentation information 210 (e.g., if any segmentation was performed in connection with the volume rendering), and volume rendering display information 212. The volume rendering display information 212 may comprise an opacity transfer function 214 and a color transfer function 216.

The combined model and color generation processor 220 may comprise suitable logic, circuitry, interfaces and/or code that may be operable to: (1) perform segmentation processing 222 to generate a 3D mask 228 from the volume rendering input 202, (2) perform mesh generation and processing from the 3D mask 228 to create a 3D mesh 238, and (3) apply color 240 to the mesh 238 based on the volume rendering input 202 to generate a multi-color 3D polygonal model 250. The combined model and color generation processor 220 may perform segmentation processing 222 to generate a 3D mask based on the volumetric data image series 206, rendering options 208, segmentation information (if any), and the opacity transfer function 214. The segmentation processing 222 may include 3D mask generation 224 and post processing 226. For example, the combined model and color generation processor 220 may perform 3D mask generation 224 by applying a threshold to the opacity transfer function 214 to create the 3D mask by eliminating image data from the image series 206 having an opacity below a threshold value in the opacity transfer function 214. The volume rendering options 208, such as cut planes applied to generate the volume rendering, may also be applied by the combined model and color generation processor 220 performing 3D mask generation 224 to eliminate image data from the image series 206 in forming the mask. If the volume rendering 202 includes segmented volumes present in view, the combined model and color generation processor 220 performing 3D mask generation 224 may apply the segmentation information 210 from the volume rendering 202 object information 204 to eliminate image data from the image series 206 to form the mask. The generated mask may be post-processed 226 to improve the model quality for 3D printing prior to performing mesh generation and processing base on the 3D mask 230. For example, the post-processing 226 may include 3D hole filling, small component removal, and/or any suitable post-processing 226 mechanism to improve the quality of the generated mask.

The combined model and color generation processor 220 may perform mesh generation and processing 230 to generate a 3D mesh 238 based on the 3D mask 228. The mesh generation and processing 230 may include marching cube processing 232, smoothing 234, and post-processing 236. For example, the combined model and color generation processor 220 may perform marching cube processing 232 by extracting a polygonal mesh of an isosurface from three-dimensional voxels. The marching cubes processing 232 proceeds through the voxels of the 3D mask 228, taking eight neighbor locations at a time to form an imaginary cube, and subsequently determines the polygon(s) needed to represent the part of the isosurface that passes through this cube. The individual polygons are then fused into the desired surface to form the 3D mesh. The 3D mesh created from the 3D mask 228 may undergo surface smoothing 234 and additional post-processing 236, such as self-intersection removal, surface decimation, and/or any suitable post-processing, before color is added to the 3D mesh 240.

The combined model and color generation processor 220 may perform mesh coloring 240 based on the volume rendering input 202. The mesh coloring 240 may include color computation 242 based on the opacity transfer function 214, color transfer function 216, and any segmentation information 210 from the volume rendering input 202. For example, the combined model and color generation processor 220 may perform color computation 242 by retrieving color map information 216 from the selected volume rendering view 202. The colors are then computed using image property values, which may be based on the opacity information 214 and any segmentation information 210, and the color map information 216 for each surface point in the 3D mesh 238. As an example, for each point of the surface of the 3D mesh 238, a normal vector is provided having property values 214, 210 along the normal. A property value for each point on the surface of the 3D mesh 238 is computed using the property values of the image on the points crossed while moving through the normal vector. The color map information 216 is applied to determine the appropriate color for each property value corresponding with each point on the surface of the 3D mesh 238. The resulting 3D mesh with assigned color values is output 250 from the combined model and color generation processor 220 as the multi-color 3D polygonal model. For example, the multi-color 3D polygonal model 250 may be presented at display screen 116, stored at any suitable data storage medium, and/or formatted by 3D printing software and provided as 3D printing data 130 to a 3D printer 120 for generating the physical model.

Figure 3:
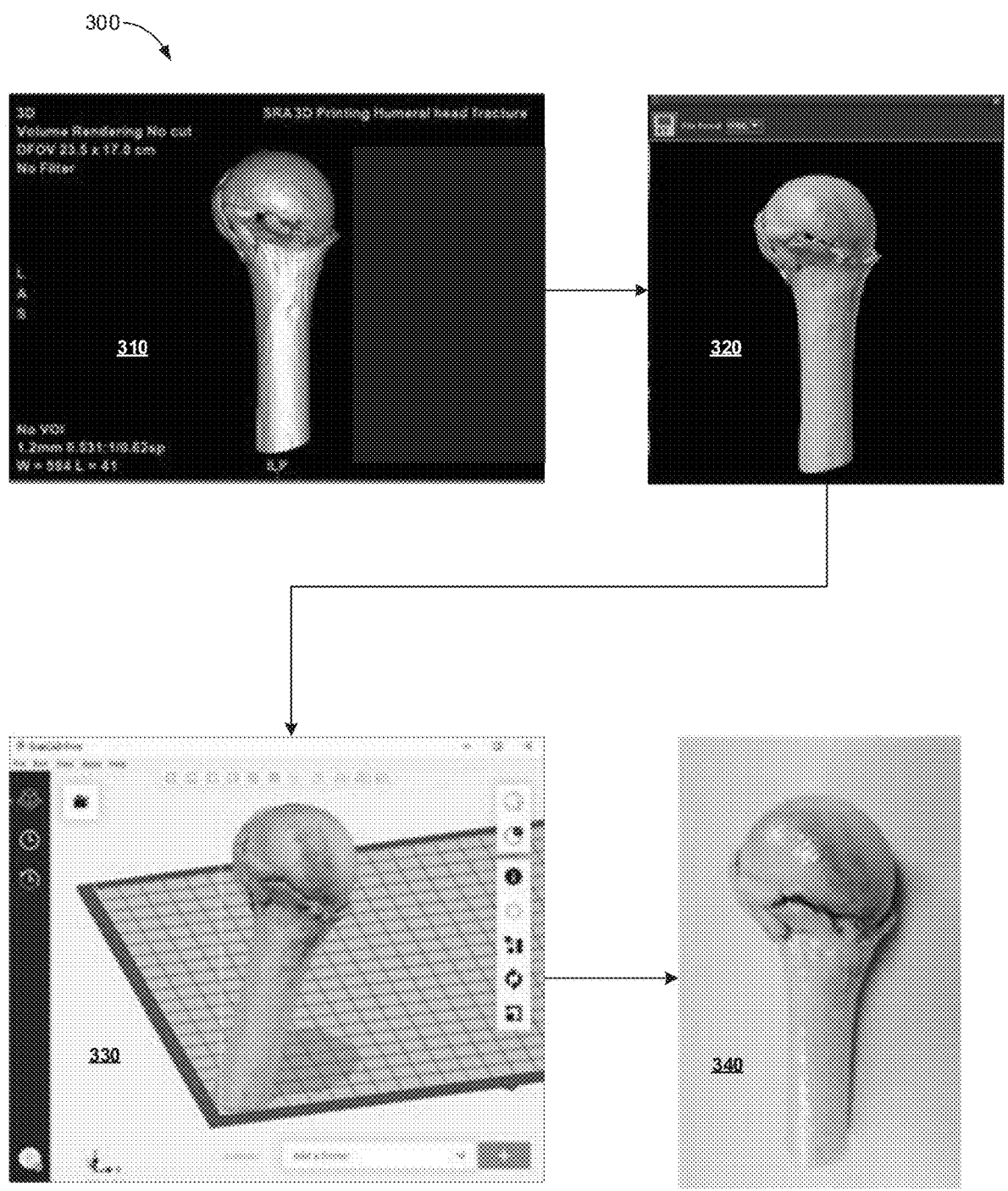
FIG. 3 illustrates an exemplary process for generating a three-dimensional (3D) printed model of an anatomical structure from a volume rendering, in accordance with various embodiments.

FIG. 3 illustrates an exemplary process 300 for generating a three-dimensional (3D) printed model 340 of an anatomical structure from a volume rendering 310, in accordance with various embodiments. Referring to FIG. 3, the process 300 comprises generating a volume rendering 310, generating a multi-color 3D polygonal model 320 from the volume rendering 310, formatting the 3D polygonal model 320 into 3D printing data 330, and printing the 3D printing data 330 to create a physical model 340 of the object(s) depicted in the volume rendering 310. The volume rendering 310 may include object information 202, such as the volumetric data image series 206, rendering options 208 (e.g., cut planes), segmentation information 210 (e.g., if any segmentation was performed in connection with the volume rendering), and volume rendering display information 212. The volume rendering display information 212 may comprise an opacity transfer function 214 and a color transfer function 216. The volume rendering 310 may be presented at a display screen 116 of a medical imaging system 110. The volume rendering 310 may be used to generate a multi-color 3D polygonal model 320, such as in response to a user input selection from user controls 118. The 3D polygonal model 320 may appear substantially the same as the volume rendering 310. The 3D polygonal model 320 may be generated based on the volume rendering 310 by a combined model and color generation processor 220 of a display/control unit 114 of the medical imaging system 110 and/or a computing system 160. For example, the combined model and color generation processor 220 may use the volumetric data image series 206, rendering options 208, segmentation information 210, and/or opacity transfer function 214 to perform 3D mask generation 224 and post-processing 226. The combined model and color generation processor 220 may use 3D mask 228 to generate a mesh using marching cubes processing 232, smoothing 234, and post-processing 236. The combined model and color generation processor 220 may apply colors to the 3D mesh 238 based on the color transfer function 216 and property values, such as the opacity transfer function 214 and any segmentation information 210, from the volume rendering 310. The colorized mesh may result in the multi-color 3D polygonal model 320 that may be provided to 3D printing software for formatting into 3D printing data 330. For example, the 3D printing software used to format the multicolor 3D polygonal model 320 into 3D printing data 330 may be GRABCAD by STRATASYS, as shown in FIG. 3. The 3D printing data 330 may be provided to a 3D printer 120 to print the physical model 340 of the anatomical object(s).

Figure 4:
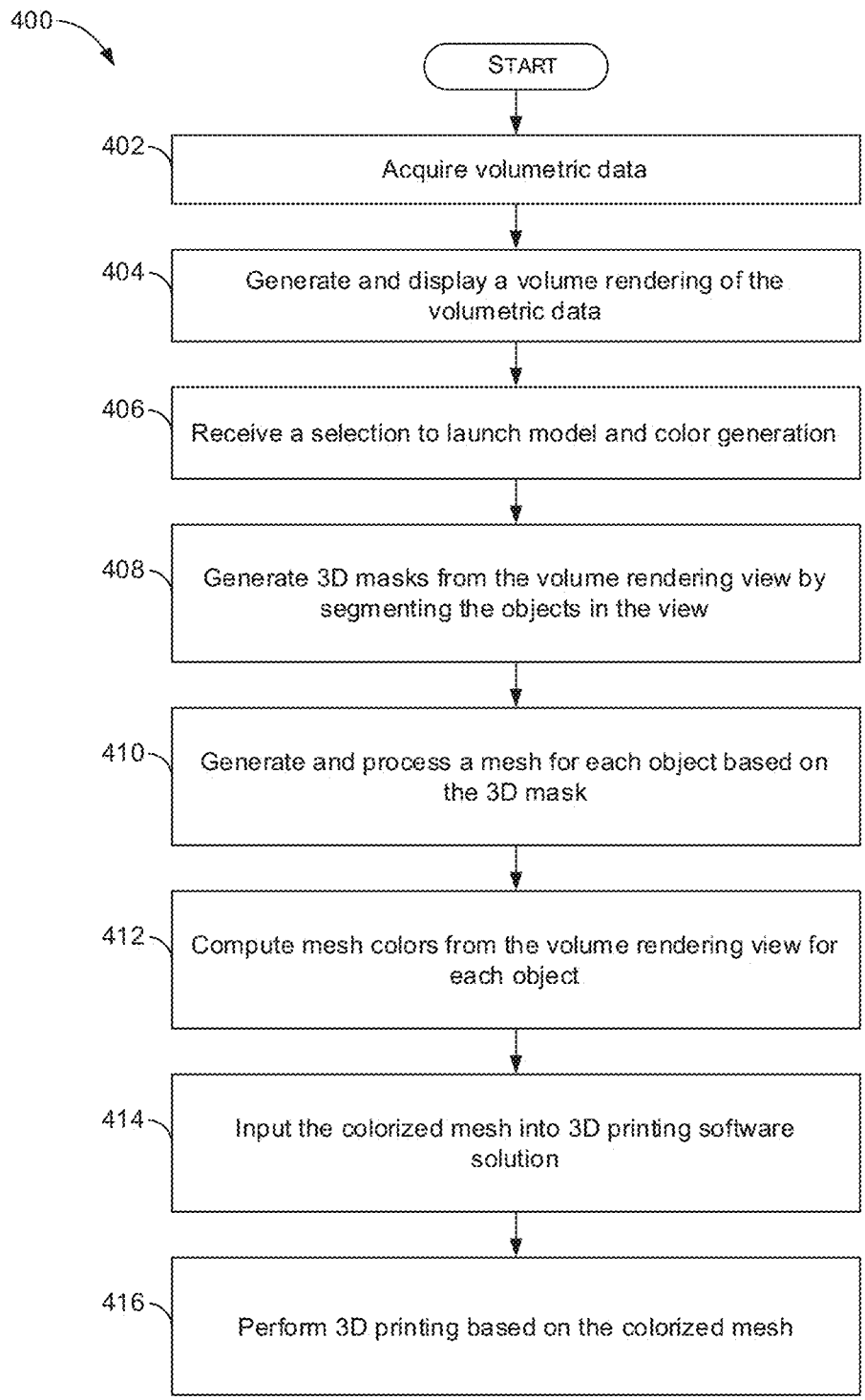
FIG. 4 is a flow chart illustrating example steps that may be performed for automatically generating a three-dimensional (3D) polygonal model with color mapping from a volume rendering for 3D printing, in accordance with various embodiments.

FIG. 4 is a flow chart 400 illustrating example steps 402-416 that may be performed automatically generating a three-dimensional (3D) polygonal model 250, 320 with color mapping from a volume rendering 202, 310 for 3D printing, in accordance with various embodiments. Referring to FIG. 4, there is shown a flow chart 400 comprising exemplary steps 402 through 416. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 402, volumetric data is acquired by a scanner 112 of a medical imaging system 110. For example, the volumetric data may be ultrasound image data acquired with an ultrasound probe, CT image data acquired with a CT scanner, MRI image data acquired with an MRI scanner, and/or any suitable medical volumetric imaging data acquired from a medical imaging device scanner.

At step 404, a volume rendering 202, 310 of the volumetric data may be generated and displayed. For example, the medical imaging system 110 or computer system 160 may generate a volume rendering 202, 310 based on the volumetric data acquired at step 402. The volume rendering 202, 310 may include object information 204 comprising a volumetric data image series 206, rendering options 208 (e.g., cut planes), segmentation information 210, and volume rendering display information 212. The volume rendering display information 212 may include an opacity transfer function 214 and a color transfer function 216. The volume rendering 202, 310 may be presented at a display screen 116 of the medical imaging system 110 and/or at any suitable display system.

At step 406, a selection to launch model and color generation is received. For example, the medical imaging system 110 or computer system 160 may receive a user selection instructing the system 110, 160 to create a multi-color 3D polygonal model 250, 320. In various embodiments, the user selection may be a single input received, for example, via user controls 118. As an example, the single user input may be a button depression, touchscreen selection, or the like initiating the automated process of creating the multi-color 3D polygonal model 250, 320 from the volume rendering 202, 310.

At step 408, 3D masks 228 are generated from the volume rendering view 202, 310 by segmenting 222, 224, 226 the objects in the view 202, 310. For example, a combined model and color generation processor 220 of the medical imaging system 110 or computer system 160 may perform segmentation processing 222 to generate a 3D mask 228 from the volume rendering input 202. The combined model and color generation processor 220 of the medical imaging system 110 or computer system 160 may perform segmentation processing 222 to generate a 3D mask based on the volumetric data image series 206, rendering options 208, segmentation information (if any), and the opacity transfer function 214. The segmentation processing 222 may include 3D mask generation 224 and post processing 226, such as 3D hole filling, small component removal, and/or any suitable post-processing 226 mechanism to improve the quality of the generated mask.

At step 410, a mesh 238 may be generated and processed for each object based on the 3D mask 228. For example, the combined model and color generation processor 220 of the medical imaging system 110 or computer system 160 may perform mesh generation and processing from the 3D mask 228 to create a 3D mesh 238. The mesh generation and processing 230 may include marching cube processing 232, smoothing 234, and post-processing 236, such as self-intersection removal, surface decimation, and/or any suitable 3D mesh post-processing.

At step 412, mesh colors may be computed 240, 242 from the volume rendering view 202, 310 for each object. For example, the combined model and color generation processor 220 may perform mesh coloring 240 based on the volume rendering input 202, 310 to generate a multi-color 3D polygonal model 250, 320. The mesh coloring 240 may include color computation 242 based on the opacity transfer function 214, color transfer function 216, and any segmentation information 210 from the volume rendering input 202. The 3D mesh with assigned color values may be output 250 from the combined model and color generation processor 220 as the multi-color 3D polygonal model 320.

At step 414, the colorized mesh 250, 320 may be input into a 3D printing software solution. For example, the multi-color 3D polygonal model 250 may be provided to 3D printing software to format the colorized mesh 250, 320 for use by a 3D printer 120.

At step 416, 3D printing may be performed based on the colorized mesh 250, 320. For example, the colorized mesh 250, 320 formatted 330 by the 3D printing software may be used by a 3D printer 120 to generate the physical model 340.

Aspects of the present disclosure provide a method 400 and system 110, 160 for automatically generating a three-dimensional (3D) polygonal model 250, 320 with color mapping from a volume rendering 202, 310. In accordance with various embodiments, the method 400 may comprise generating 404, by at least one processor 114, 160, a volume rendering 202, 310 from volumetric data. The method 400 may comprise receiving 406, by the at least one processor 114, 160, a user selection to launch model and color generation. The method 400 may include automatically performing, by the at least one processor 114, 160, 220, 222, 224 and in response to the user selection, generating 408 a three-dimensional (3D) mask 228 from the volume rendering 202, 310 by segmenting at least one object in the volume rendering 202, 310. The method 400 may include automatically performing, by the at least one processor 114, 160, 220, 230, 232 and in response to the user selection, generating 410 a 3D mesh 238 for the at least one object based on the 3D mask 228. The method 400 may include automatically performing, by the at least one processor 114, 160, 220, 240, 242 and in response to the user selection, computing 412 mesh colors based on the volume rendering 202, 310. The mesh colors may be applied to the 3D mesh 238 to generate a multi-color 3D polygonal model 250, 320. The method 400 may include automatically performing, by the at least one processor 114, 160, 220 and in response to the user selection, outputting the multi-color 3D polygonal model 250, 320.

In a representative embodiment, the generating 408 the 3D mask 228 comprises applying a threshold to an opacity transfer function 214 to eliminate image data having an opacity below the threshold in the opacity transfer function 214. In an exemplary embodiment, the generating 408 the 3D mask 228 comprises applying cut planes 208 of the volume rendering 202, 310. In certain embodiments, the method 400 may include post-processing 408, 226 the 3D mask 228. The post-processing 408, 226 may comprise one or both of 3D hole filling and small component removal. In various embodiments, the generating 410 the 3D mesh 238 comprises performing marching cube processing 232. In a representative embodiment, the method 400 may comprise performing 410 surface smoothing 234 to the 3D mesh 238 and post-processing 236 the 3D mesh 238. The post-processing 236 may include one or both of self-intersection removal and surface decimation 236. In an exemplary embodiment, the computing 410 mesh colors may be based at least in part on an opacity transfer function 214 and color transfer function 216 of the volume rendering 202, 310. In certain embodiments, the method 400 may comprise providing 414 the multi-color 3D polygonal model 250, 320 to 3D printing software to format the multi-color 3D polygonal model 330 for use by a 3D printer 120.

Various embodiments provide a system 110, 160 for automatically generating a three-dimensional (3D) polygonal model 250, 320 with color mapping from a volume rendering 202, 310. The system may comprise an electronic device 110, 160 comprising at least one processor 114, 160, 220. The at least one processor 114, 160 may be operable to generate a volume rendering 202, 310 from volumetric data. The at least one processor 114, 160, may be operable to receive a user selection to launch model and color generation. The at least one processor 114, 160, 220, 222, 224, in response to the user selection, may be operable to automatically generate a three-dimensional (3D) mask 228 from the volume rendering 202, 310 by segmenting at least one object in the volume rendering 202, 310. The at least one processor 114, 160, 220, 230, 232, in response to the user selection, may be operable to automatically generate a 3D mesh 238 for the at least one object based on the 3D mask 228. The at least one processor 114, 160, 220, 240, 242, in response to the user selection, may be operable to automatically compute mesh colors based on the volume rendering 202, 310. The mesh colors may be applied to the 3D mesh 238 to generate a multi-color 3D polygonal model 250, 320. The at least one processor 114, 160, 220, in response to the user selection, may be operable to automatically output the multi-color 3D polygonal model 250, 320.

In an exemplary embodiment, the electronic device 110, 160 may be operable to receive the volumetric data from a medical imaging device 110 that is operable to generate the volumetric data based on a particular imaging technique. In certain embodiments, the electronic device 110, 160 may comprise a medical imaging device 110 operable to generate the volumetric data based on a particular imaging technique. In various embodiments, the at least one processor 114, 160, 220, 222, 224 may be operable to generate the 3D mask 228 by applying a threshold to an opacity transfer function 214 to eliminate image data having an opacity below the threshold in the opacity transfer function 214 and/or applying cut planes 208 of the volume rendering 202, 310. In a representative embodiment, the at least one processor 114, 160, 220, 222, 226 may be operable to one or both of perform 3D hole filing on the 3D mask 228 and perform small component removal on the 3D mask 228. In certain embodiments, the at least one processor 114, 160, 220, 230, 234, 236 may be operable to perform surface smoothing to the 3D mesh 238, and post-process the 3D mesh 238 by performing one or both of self-intersection removal and surface decimation. In an exemplary embodiment, the at least one processor 114, 160, 220 may be operable to provide the multi-color 3D polygonal model 250, 320 to 3D printing software to format the multi-color 3D polygonal model 330 for use by a 3D printer 120.

Certain embodiments provide a non-transitory computer readable medium having stored thereon, a computer program having at least one code section. The at least one code section is executable by a machine for causing the machine to perform steps 400. The steps 400 may comprise generating 404 a volume rendering 202, 310 from volumetric data. The steps 400 may comprise receiving 406 a user selection to launch model and color generation. The steps 400 may comprise automatically performing, in response to the user selection, generating 408 a three-dimensional (3D) mask 228 from the volume rendering 202, 310 by segmenting at least one object in the volume rendering 202, 310. The steps 400 may comprise automatically performing, in response to the user selection, generating 410 a 3D mesh 238 for the at least one object based on the 3D mask 228. The steps 400 may comprise automatically performing, in response to the user selection, computing 412 mesh colors based on the volume rendering 202, 310. The mesh colors may be applied to the 3D mesh 238 to generate a multi-color 3D polygonal model 250, 320. The steps 400 may comprise automatically performing, in response to the user selection, outputting the multi-color 3D polygonal model 250, 320.

In various embodiments, the generating the 3D mask 408 may comprise applying a threshold to an opacity transfer function 214 to eliminate image data having an opacity below the threshold in the opacity transfer function 214 and/or applying cut planes 208 of the volume rendering 202, 310. In a representative embodiment, the steps 400 may comprise performing 410 surface smoothing 234 to the 3D mesh 238, and post-processing 236 the 3D mesh 238. The post-processing 236 may comprise one or both of self-intersection removal and surface decimation. In an exemplary embodiment, the computing 412 mesh colors may be based at least in part on an opacity transfer function 214 and color transfer function 216 of the volume rendering 202, 310. In certain embodiments, the steps 400 may comprise providing 414 the multi-color 3D polygonal model 250, 320 to 3D printing software to format the multi-color 3D polygonal model 330 for use by a 3D printer 120.

As utilized herein the term "circuitry" refers to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "example" means serving as a non-limiting example, instance, or illustration. As utilized herein, the terms "for example" and "e.g.," set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for automatically generating a three-dimensional (3D) polygonal model with color mapping from a volume rendering.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
generating, by at least one processor, a volume rendering from volumetric data;
receiving, by the at least one processor, a user selection to launch model and color generation; and
in response to the user selection, automatically performing, by the at least one processor:
generating a three-dimensional (3D) mask from the volume rendering by segmenting at least one object in the volume rendering;
generating a 3D mesh for the at least one object based on the 3D mask;
computing mesh colors based on the volume rendering, the mesh colors applied to the 3D mesh to generate a multi-color 3D polygonal model; and
outputting the multi-color 3D polygonal model.

2. The method of claim 1, wherein the generating the 3D mask comprises applying a threshold to an opacity transfer function to eliminate image data having an opacity below the threshold in the opacity transfer function.

3. The method of claim 1, wherein the generating the 3D mask comprises applying cut planes of the volume rendering.

4. The method of claim 1, comprising post-processing the 3D mask, wherein the post-processing comprises one or both of 3D hole filling and small component removal.

5. The method of claim 1, wherein the generating the 3D mesh comprises performing marching cube processing.

6. The method of claim 1, comprising:
performing surface smoothing to the 3D mesh, and
post-processing the 3D mesh, wherein the post-processing comprises one or both of self-intersection removal and surface decimation.

7. The method of claim 1, wherein the computing mesh colors is based at least in part on an opacity transfer function and color transfer function of the volume rendering.

8. The method of claim 1, comprising providing the multi-color 3D polygonal model to 3D printing software to format the multi-color 3D polygonal model for use by a 3D printer.

9. A system, comprising:
an electronic device comprising at least one processor operable to:
generate a volume rendering from volumetric data;
receive a user selection to launch model and color generation;
automatically perform, in response to the user selection, at least:
generate a three-dimensional (3D) mask from the volume rendering by segmenting at least one object in the volume rendering;
generate a 3D mesh for the at least one object based on the 3D mask;
compute mesh colors based on the volume rendering, the mesh colors applied to the 3D mesh to generate a multi-color 3D polygonal model; and
output the multi-color 3D polygonal model.

10. The system of claim 9, wherein the electronic device is operable to receive the volumetric data from a medical imaging device that is operable to generate the volumetric data based on a particular imaging technique.

11. The system of claim 9, wherein the electronic device comprises a medical imaging device operable to generate the volumetric data based on a particular imaging technique.

12. The system of claim 9, wherein the at least one processor is operable to generate the 3D mask by one or both of:
   applying a threshold to an opacity transfer function to eliminate image data having an opacity below the threshold in the opacity transfer function, and
   applying cut planes of the volume rendering.

13. The system of claim 9, wherein the at least one processor is operable to one or both of perform 3D hole filing on the 3D mask and perform small component removal on the 3D mask.

14. The system of claim 9, wherein the at least one processor is operable to:
   perform surface smoothing to the 3D mesh, and
   post-process the 3D mesh by performing one or both of self-intersection removal and surface decimation.

15. The system of claim 9, wherein the at least one processor is operable to provide the multi-color 3D polygonal model to 3D printing software to format the multi-color 3D polygonal model for use by a 3D printer.

16. A non-transitory computer readable medium having stored thereon, a computer program having at least one code section, the at least one code section being executable by a machine for causing the machine to perform one or more steps comprising:
   generating a volume rendering from volumetric data;
   receiving a user selection to launch model and color generation;
   automatically performing, in response to the user selection, at least:
      generating a three-dimensional (3D) mask from the volume rendering by segmenting at least one object in the volume rendering;
      generating a 3D mesh for the at least one object based on the 3D mask;
      computing mesh colors based on the volume rendering, the mesh colors applied to the 3D mesh to generate a multi-color 3D polygonal model; and
      outputting the multi-color 3D polygonal model.

17. The non-transitory computer readable medium of claim 16, wherein the generating the 3D mask comprises one or both of:
   applying a threshold to an opacity transfer function to eliminate image data having an opacity below the threshold in the opacity transfer function, and
   applying cut planes of the volume rendering.

18. The non-transitory computer readable medium of claim 16, comprising:
   performing surface smoothing to the 3D mesh, and
   post-processing the 3D mesh, wherein the post-processing comprises one or both of self-intersection removal and surface decimation.

19. The non-transitory computer readable medium of claim 16, wherein the computing mesh colors is based at least in part on an opacity transfer function and color transfer function of the volume rendering.

20. The non-transitory computer readable medium of claim 16, comprising providing the multi-color 3D polygonal model to 3D printing software to format the multi-color 3D polygonal model for use by a 3D printer.

* * * * *